United States Patent
Liu et al.

(10) Patent No.: US 9,979,972 B2
(45) Date of Patent: *May 22, 2018

(54) METHOD AND APPARATUS FOR RATE CONTROL ACCURACY IN VIDEO ENCODING AND DECODING

(75) Inventors: Yali Liu, Davis, CA (US); Xiaoan Lu, Princeton, NJ (US); Cristina Gomila, Princeton, NJ (US); Qian Xu, Plainsboro, NJ (US)

(73) Assignee: Thomson Licensing DTV (FR)

( * ) Notice: Subject to any disclaimer, the term of this patent is extended or adjusted under 35 U.S.C. 154(b) by 363 days.

This patent is subject to a terminal disclaimer.

(21) Appl. No.: 12/733,947

(22) PCT Filed: Sep. 15, 2008

(86) PCT No.: PCT/US2008/010733
§ 371 (c)(1),
(2), (4) Date: Mar. 30, 2010

(87) PCT Pub. No.: WO2009/048501
PCT Pub. Date: Apr. 16, 2009

(65) Prior Publication Data
US 2010/0232498 A1    Sep. 16, 2010

Related U.S. Application Data

(60) Provisional application No. 60/977,926, filed on Oct. 5, 2007.

(51) Int. Cl.
*H04N 7/26* (2006.01)
*H04N 19/196* (2014.01)
(Continued)

(52) U.S. Cl.
CPC ......... *H04N 19/198* (2014.11); *H04N 19/126* (2014.11); *H04N 19/149* (2014.11);
(Continued)

(58) Field of Classification Search
CPC ....... H04N 19/00381; H04N 19/00193; H04N 19/00357; H04N 19/00096;
(Continued)

(56) References Cited

U.S. PATENT DOCUMENTS 6,044,115 A    3/2000 Horiike et al.
6,091,774 A *  7/2000 Hyodo ................. H04N 19/176
                                        348/419.1
(Continued)

FOREIGN PATENT DOCUMENTS

JP    10-174103 A    6/1998
JP    2004-201298 A  7/2004
(Continued)

OTHER PUBLICATIONS

Wedi, T.; Wittmann, S.; , "Quantization offsets for video coding," IEEE 2005.*
(Continued)

*Primary Examiner* — Mohammed Rahaman
(74) *Attorney, Agent, or Firm* — Jack Schwartz & Associates, PLLC

(57) ABSTRACT

Methods and apparatus are provided for rate control accuracy in video encoding and decoding. An apparatus includes a video encoder for encoding image data using rate control. The rate control involves estimating a quantization step size and adjusting a rounding offset. The rounding offset is capable of being non-constant during the encoding.

27 Claims, 7 Drawing Sheets

(51) Int. Cl.
*H04N 19/149* (2014.01)
*H04N 19/61* (2014.01)
*H04N 19/126* (2014.01)
*H04N 19/152* (2014.01)
*H04N 19/192* (2014.01)

(52) U.S. Cl.
CPC ......... *H04N 19/152* (2014.11); *H04N 19/192* (2014.11); *H04N 19/196* (2014.11); *H04N 19/61* (2014.11)

(58) Field of Classification Search
CPC ....... H04N 19/00369; H04N 19/00181; H04N 19/00781; H04N 7/26079; H04N 7/26085; H04N 7/26117; H04N 7/26175; G06T 9/007; G06T 9/008; G06T 3/4084
USPC .................................................. 375/240.03
See application file for complete search history.

(56) References Cited

U.S. PATENT DOCUMENTS

| | | | | |
|---|---|---|---|---|
| 6,141,447 | A * | 10/2000 | Linzer et al. | ................. 382/236 |
| 7,346,106 | B1 * | 3/2008 | Jiang | ................... H04N 19/172 375/240.12 |
| 2004/0120398 | A1 | 6/2004 | Zhang et al. | |
| 2004/0151245 | A1 * | 8/2004 | Lainema et al. | ......... 375/240.03 |
| 2005/0180502 | A1 * | 8/2005 | Puri | ........................ 375/240.03 |
| 2006/0098733 | A1 * | 5/2006 | Matsumura et al. | .... 375/240.03 |
| 2007/0140334 | A1 * | 6/2007 | Sun | ........................ 375/240.03 |
| 2007/0280349 | A1 * | 12/2007 | Prieto et al. | ............ 375/240.03 |
| 2009/0086814 | A1 * | 4/2009 | Leontaris | ............. H04N 19/105 375/240.02 |
| 2009/0086816 | A1 * | 4/2009 | Leontaris | ............. H04N 19/154 375/240.03 |

FOREIGN PATENT DOCUMENTS

| | | |
|---|---|---|
| JP | 2006-67302 A2 | 3/2006 |
| JP | 2006-94081 A | 4/2006 |
| JP | 2006-157881 A | 6/2006 |
| JP | 2007-53788 A | 3/2007 |
| WO | WO0154417 | 7/2001 |
| WO | 2007/099039 A1 | 9/2007 |
| WO | WO2007135626 | 11/2007 |

OTHER PUBLICATIONS

Han et al.:"Adaptive Quantization for Interlaced Video Coding," $2^{nd}$ International Conference on Wireless Communications, Networking and Mobile Computing, IEEE, Sep. 22, 2006, pp. 1-4.
Wedi et al.:"Quantization Offsets for Video Coding," Circuits and Systems, 2005. ISCAS 2005. IEEE International Symposium O N Kobe, Japan, May 23, 2005, pp. 324-327.
Sullivan: "Adaptive Quantization Encoding Technique using an Equal Expected-Value Rule," Microsoft Cooperation, Joint Video Team (JVT) of ISO/IEC MPEG & ITU-T VCEG, Doc. JVT-N011, Jan. 18, 2005, pp. 1-9.
Liu et al.:"A Novel Fine Rate Control Algorithm with Adaptive Rounding Offset," International Symposium on Circuits and Systems, May 18, 2008, pp. 3490-3493.
He et al.:"A Linear Source Model and a Unified Rate Control Algorithm for DCT Video Coding," IEEE Transactions on Circuits and Systems for Video Technology, vol. 12, No. 11, Nov. 2002, pp. 970-982.
International Telecommunications Union:"Advanced Video Coding for Generic Audiovisual Services," ITU_T Recommendation H.264, Mar. 2005, pp. ii-325.
He et al.: Linear Rate Control for JVT Video Coding, Sarnoff Corporation, Princeton, NJ, pp. 65-68. Aug. 2003.
Ribas-Corbera et al.:"Rate Control in DCT Video Coding for Low-Delay Communications," IEEE Transactions on Circuits and Systems for Video Technology, vol. 9, No. 1, Feb. 1999, pp. 172-185.

* cited by examiner

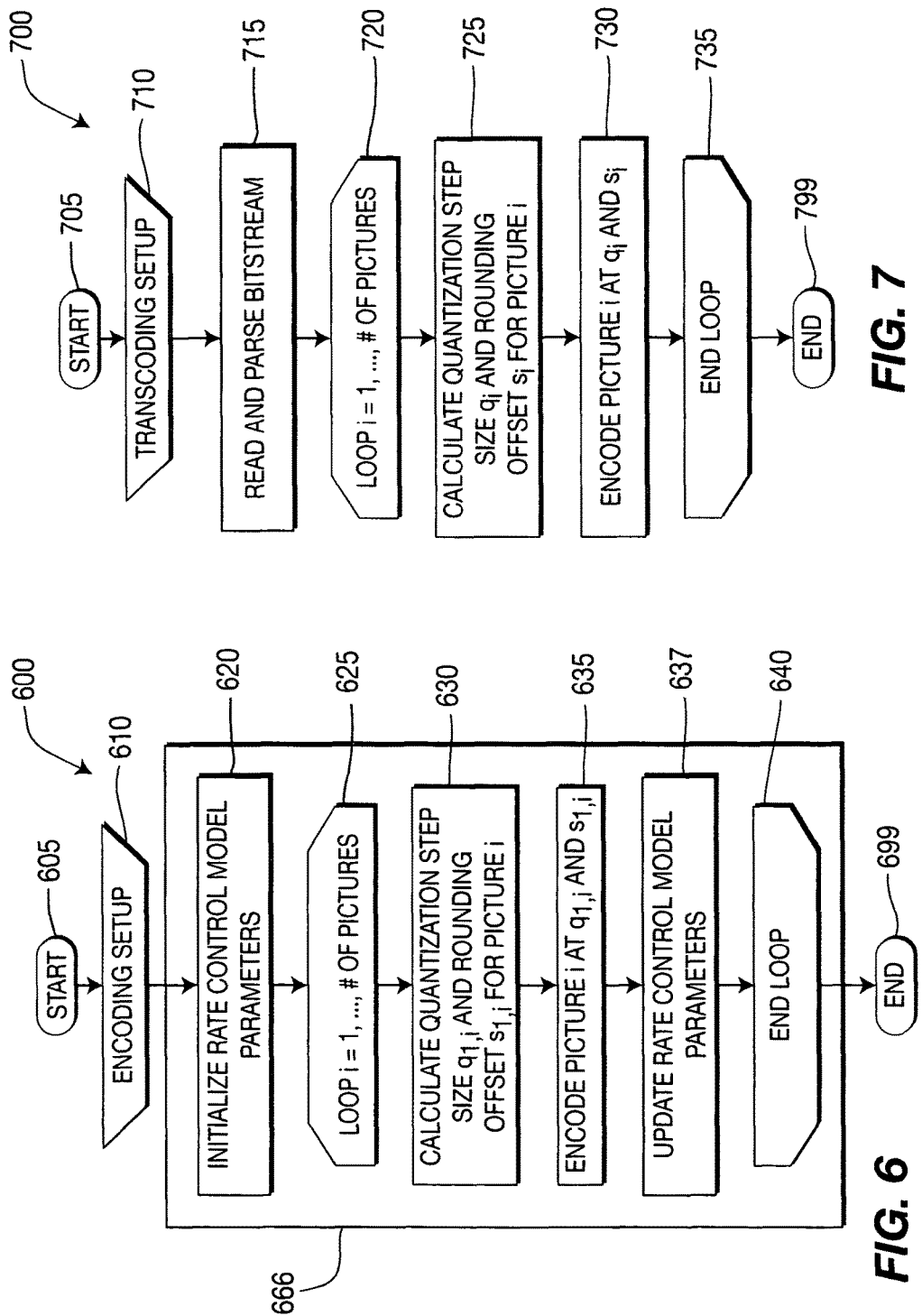

METHOD AND APPARATUS FOR RATE CONTROL ACCURACY IN VIDEO ENCODING AND DECODING

CROSS-REFERENCE TO RELATED APPLICATIONS

This application is a National Stage Application and claims the benefit, under 35 U.S.C. § 365 of International Application PCT/US2008/010733 filed Sep. 15, 2008, which was published in accordance with PCT Article 21(2) on Apr. 16, 2009 in English, and which claims the benefit of U.S. Provisional Patent Application No. 60/977,926 filed on Oct. 5, 2007.

TECHNICAL FIELD

The present principles relate generally to video encoding and, more particularly, to a method and apparatus for rate control accuracy in video encoding and decoding.

BACKGROUND

Most video coding applications constrain the encoder to compress the input video at a given target bit rate. In order to achieve this, the encoder uses a rate control system. A rate control system allocates a number of bits to each picture in the input video source and adjusts encoding parameters to match the allocated number of bits. The performance of a rate control system is measured by the accuracy in meeting the target bit rate and the visual quality of the compressed video. In video coding standards such as the International Organization for Standardization/International Electrotechnical Commission (ISO/IEC) Moving Picture Experts Group-2 Standard (hereinafter the "MPEG-2 Standard"), the ISO/IEC Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), and the Society of Motion Picture and Television Engineers (SMPTE) Video Codec-1 Standard (hereinafter the "VC-1 Standard"), there are several quantization parameters that influence the bit rate such as the quantization step size, the rounding offset and the quantization matrix.

For illustrative purposes, the quantization process of the MPEG-4 AVC Standard will now be discussed. Mathematically, in the encoder the transformed coefficients are quantized as follows:

$$Z = \left\lfloor \frac{|W|}{q} + s \right\rfloor \cdot \text{sgn}(W), \quad (1)$$

where W is the transformed coefficient and is quantized to a quantization level Z. Here, q is the quantization step size and s is the rounding offset. The function $\lfloor . \rfloor$ rounds a value to the nearest integer and sgn(.) returns the sign of a signal. When the quantization matrix is applied, the coefficients are scaled first before the quantization process at the encoder. The range of W where it is quantized to 0 is referred to as the deadzone. In this particular case, the deadzone is $\Delta = 2 \times (1-s) \times q$. At the decoder, the quantization level Z is reconstructed to the signal W'. This is called inverse quantization and is described mathematically as:

$$W' = q \cdot Z \quad (2)$$

A rate control algorithm adjusts the quantization parameters to obtain the target number of bits. A rate control algorithm is generally considered to be accurate when the number of bits used for some time interval is close or substantially equal to the allocated number of bits for this time interval. The specific time interval used to measure the rate control accuracy is defined depending on the applications. In some applications, the bit rate is preferred to be accurate on a picture level. In other applications such as broadcast, the bit rate is preferred to be accurate over a few frames due to the channel bandwidth constraint. In some other applications such as DVD authoring, the bit rate accuracy is often measured for the entire sequence and is considered accurate when the number of bits consumed by the entire movie meets the requirement.

Existing rate control algorithms assume the rounding offset and quantization matrix are constant and only adjust the quantization step size. The quantization step sizes have only a finite number of choices. They are represented by quantization indices, which are embedded in the encoded bitstream and conveyed to the decoder for reconstructing the video. With a limited number of quantization step sizes to choose from, existing rate control algorithms can hardly achieve very accurate control without loss of the quality. Loss of quality due to the rate control algorithm is often seen as quality inconsistence within a picture or across two or more pictures. A picture with lower quality may include visible artifacts that causes part of the picture to be displayed distorted.

To improve the rate control accuracy for a picture, a common approach in existing algorithms is to apply macroblock-level (MB-level) rate control. In the prior art, $\rho$-domain rate control method has been used to illustrate this approach. A $\rho$-domain rate control method assumes a linear relation between $\rho$ and R, where $\rho$ is the percentage of zero coefficients among the quantized transformed coefficients for an encoded region and R is the number of bits used for encoding the region. Mathematically, this may be represented by the following linear rate model:

$$R(\rho) = \theta(1-\rho) + R_c, \quad (3)$$

where $R_c$ is the number of non-texture bits used for encoding a region and $\theta$ is a constant.

Note that $\rho$ monotonically increases with the quantization step size q, which implies that there is a one-to-one mapping between them. Therefore, given the target number of bits R, the estimated parameters $\theta$ and $R_c$, $\rho$-domain rate control method obtains the value of $\rho$, and therefore the quantization step size q based on the one-to-one $\rho$–q mapping.

Often the quantization step size q calculated above may not fall into the limited number of quantization step sizes that can be represented by quantization indices in the encoder. One approach is to let the macroblocks within the picture use quantization step sizes around q', the quantization step size that is closest to q and can be represented by a quantization index. Moreover, the average quantization step size used by the picture is approximately q. In one embodiment, a macroblock can choose from quantization step sizes $\{q'-\Delta_1, q', q'+\Delta_2\}$. Another approach is to update $\theta$ and $R_c$ after each macroblock is encoded, and calculate q for each macroblock.

In another popular rate control algorithm referred to as TMN8, a quantization step size q is first calculated for a picture. The encoder starts encoding macroblocks with q. Then as more macroblocks are encoded, the rate control model parameters are updated and the quantization step size is updated on a macroblock basis.

One problem with the MB-level adjustment is that the quantization step sizes vary among macroblocks. In some cases, the difference between the quantization parameters can cause quality inconsistence within the picture.

Turning to FIG. 1, a method for rate control for video encoding is indicated generally by the reference numeral 100.

The method 100 includes a start block 105 that passes control to a function block 110. The function block 110 performs and/or otherwise involves an encoding setup, and passes control to a function block 115. The function block 115 initializes rate control parameters, and passes control to a loop limit block 120. The loop limit block 120 performs a loop over each macroblock in a current picture being processed, using a variable i, where i=1, . . . , number (#) of macroblocks in the picture, and passes control to a function block 125. The function block 125 calculates the quantization step size $q_i$ for macroblock i, and passes control to a function block 130. The function block 130 encodes macroblock i at quantization step size $q_i$, and passes control to a function block 135. The function block 135 updates the rate control model parameters (for example, based on previously encoded macroblocks), and passes control to a loop limit block 140. The loop limit block ends the loop, and passes control to an end block 199.

It is to be appreciated that method 100 of FIG. 1, the rounding offset parameter is constant throughout the encoding process to which applies method 100.

It is to be further appreciated that function block 110 may optionally involve the aid of an operator. Moreover, the encoder setup corresponding to function block 110 may involve the setup of the target bit rate as well as the specification of any set of parameters involved in the encoding process.

Moreover, it is to be appreciated the calculation of the quantization step size $q_i$ for macroblock i performed by function block 125 may be based on, for example, the ρ-domain rate model or the TMN8 rate model.

The quantization step sizes used by all macroblocks, $\{q_i\}_{i=1, \ldots, \# \, of \, MBs}$ may vary significantly and cause quality inconsistencies within the picture. To obtain more consistent quality in the picture, the encoder can choose to limit the dynamic range of the quantization step size. As a result, the number of bits that a picture actually uses may differ significantly from the target number of bits.

Thus, as described above, prior art rate control methods either lack rate control accuracy or create quality inconsistencies.

SUMMARY

These and other drawbacks and disadvantages of the prior art are addressed by the present principles, which are directed to a method and apparatus for rate control accuracy in video encoding and decoding.

According to an aspect of the present principles, there is provided an apparatus. The apparatus includes a video encoder for encoding image data using rate control. The rate control involves estimating a quantization step size and adjusting a rounding offset. The rounding offset is capable of being non-constant during the encoding.

According to another aspect of the present principles, there is provided a method. The method includes encoding image data using rate control, wherein the rate control involves estimating a quantization step size and adjusting a rounding offset. The rounding offset is capable of being non-constant during the encoding.

According to yet another aspect of the present principles, there is provided an apparatus. The apparatus includes a video decoder for decoding image data in a bitstream using rate control. The rate control involves a quantization step size and a rounding offset. The rounding offset is capable of being non-constant during the decoding and one of, estimated based on information at least one of in and pertaining to the bitstream, and extracted from the bitstream.

According to still another aspect of the present principles, there is provided a method. The method includes decoding image data in a bitstream using rate control. The rate control involves a quantization step size and a rounding offset. The rounding offset is capable of being non-constant during the decoding step and one of, estimated based on information at least one of in and pertaining to the bitstream, and extracted from the bitstream.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 6 is a flow diagram for an exemplary rate control method in a single-pass video encoder, the method including a non-constant rounding offset, in accordance with an embodiment of the present principles;

FIG. 7 is a flow diagram for an exemplary rate control method in a transcoder, in accordance with an embodiment of the present principles;

DETAILED DESCRIPTION

Figure 1:
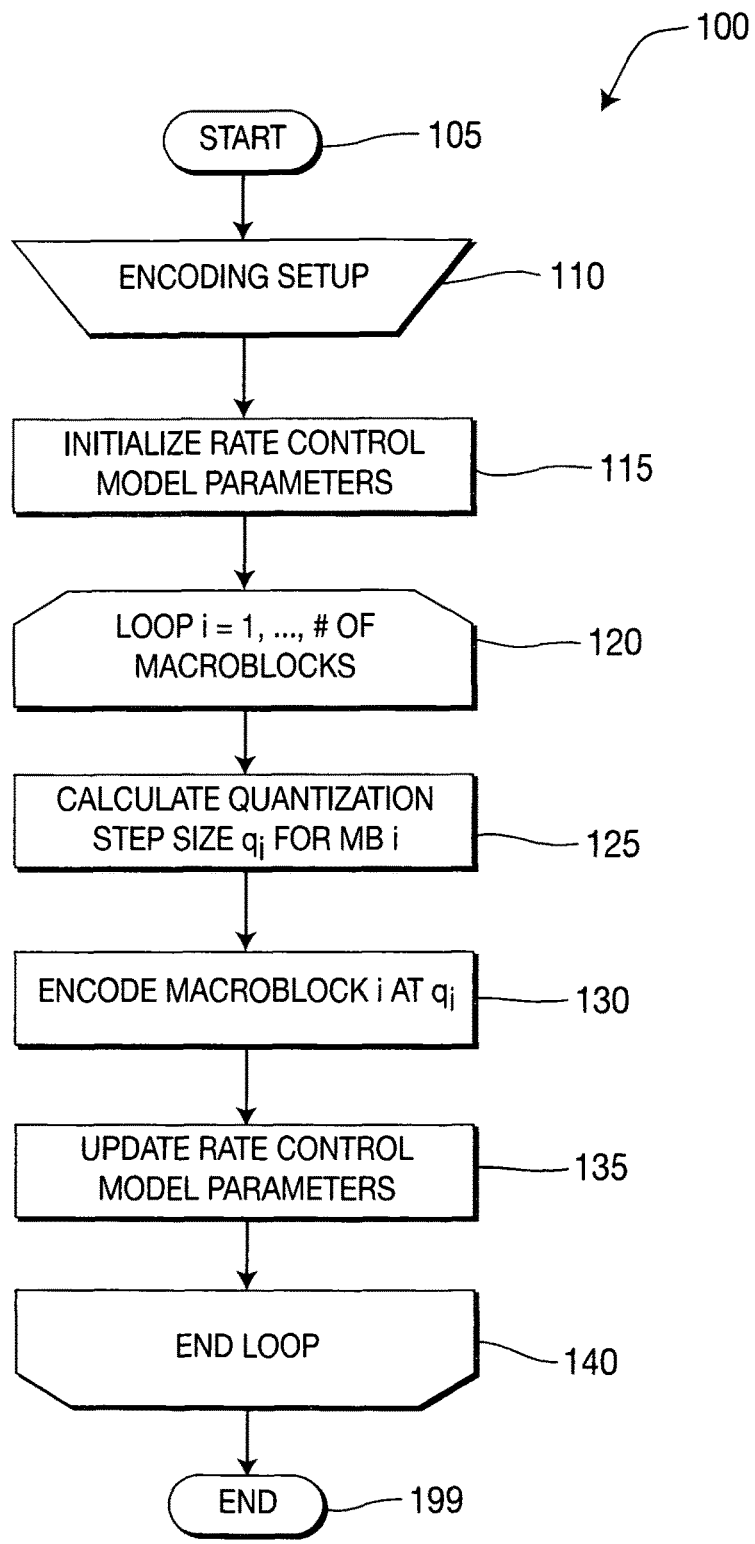
FIG. 1 is a flow diagram for a rate control method in a video encoder, in accordance with the prior art.

The present principles are directed to a method and apparatus for rate control accuracy in video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

The phrase image data as used herein refers to any of still image data and motion image data, including frames, fields, pictures, image blocks, image sub-blocks, and so forth.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles. For example, the present principles may be used with respect to any of, but is not limited to, the ITU-T H.263 Recommendation (hereinafter the "H.263 Recommendation", the MPEG-2 Standard, the MPEG-4 AVC Standard, the VC-1 Standard, and so forth.

As mentioned above, the present principles are directed to a method and apparatus for rate control accuracy in video encoding and decoding.

Figure 2:
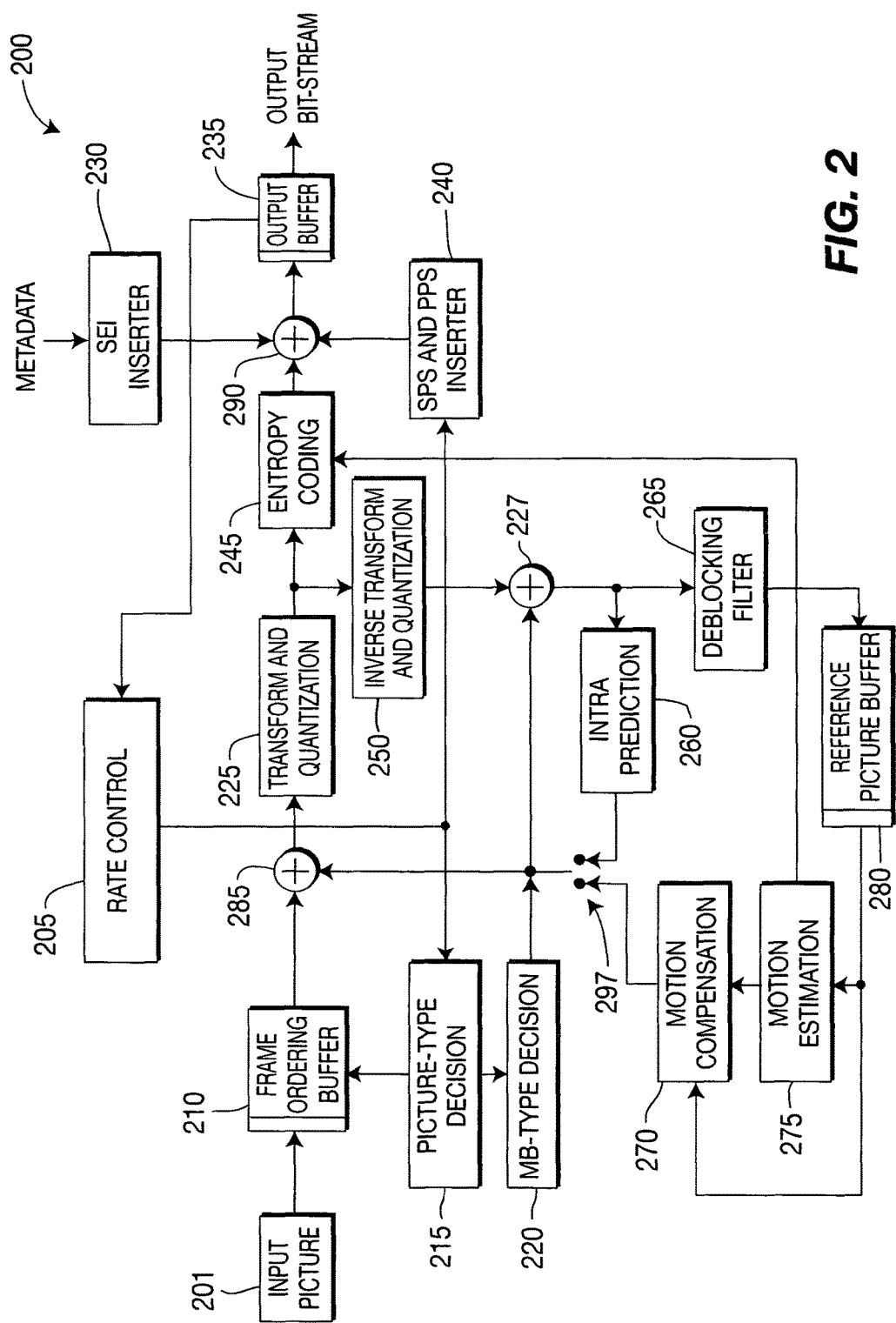
FIG. 2 is a block diagram for an exemplary video encoder to which the present principles may be applied, in accordance with an embodiment of the present principles.

Turning to FIG. 2, an exemplary video encoder to which the present principles may be applied is indicated generally by the reference numeral 200.

The encoder 200 includes a frame ordering buffer 210 having an output connected in signal communication with a first non-inverting input of a combiner 285. An output of the combiner 285 is connected in signal communication with an input of a transformer and quantizer 225. An output of the transformer and quantizer 225 is connected in signal communication with a first input of an entropy coder 245 and an input of an inverse transformer and quantizer 250. An output of the entropy coder 245 is connected in signal communication with a first non-inverting input of a combiner 290. An output of the combiner is connected in signal communication with an input of an output buffer 235. A first output of the output buffer 235 is connected in signal communication with an input of a rate controller 205.

An output of a Supplemental Enhancement Information (SEI) inserter 230 is connected in signal communication with a second input of the combiner 290.

An output of the inverse transformer and quantizer 250 is connected in signal communication with a first non-inverting input of a combiner 227. An output of the combiner 227 is connected in signal communication with an input of an intra predictor 260 and an input of a deblocking filter 265. An output of the deblocking filter 265 is connected in signal communication with an input of a reference picture buffer 280. An output of the reference picture buffer 280 is connected in signal communication with an input of a motion estimator 275 and a first input of a motion compensator 270.

A first output of the motion estimator 275 is connected in signal communication with a second input of the motion compensator 270. A second output of the motion estimator 275 is connected in signal communication with a second input of the entropy coder 245.

An output of the motion compensator 270 is connected in signal communication with a first input of a switch 297. An output of the intra predictor 260 is connected in signal communication with a second input of the switch 297. An output of a macroblock-type decision module 220 is connected in signal communication with a third input of the switch 297. An output of the switch 297 is connected in signal communication with a second non-inverting input of the combiner 285 and a second non-inverting input of the combiner 227.

An output of the rate controller 205 is connected in signal communication with a first input of a picture-type decision module 215, and an input of a sequence parameter set (SPS) and picture parameter set (PPS) inserter 240. An output of the SPS and PPS inserter 240 is connected in signal communication with a third input of the combiner 290.

A first output of the picture-type decision module 215 is connected in signal communication with an input of the macroblock-type decision module 220. A second output of the picture-type decision module 215 is connected in signal communication with a second input of the frame ordering buffer 210.

A first input of the frame ordering buffer 210 is available as an input to the encoder 200, for receiving an input picture 201. A first output of the output buffer 235 is available as an output of the encoder 200, for outputting a bitstream.

Figure 3:
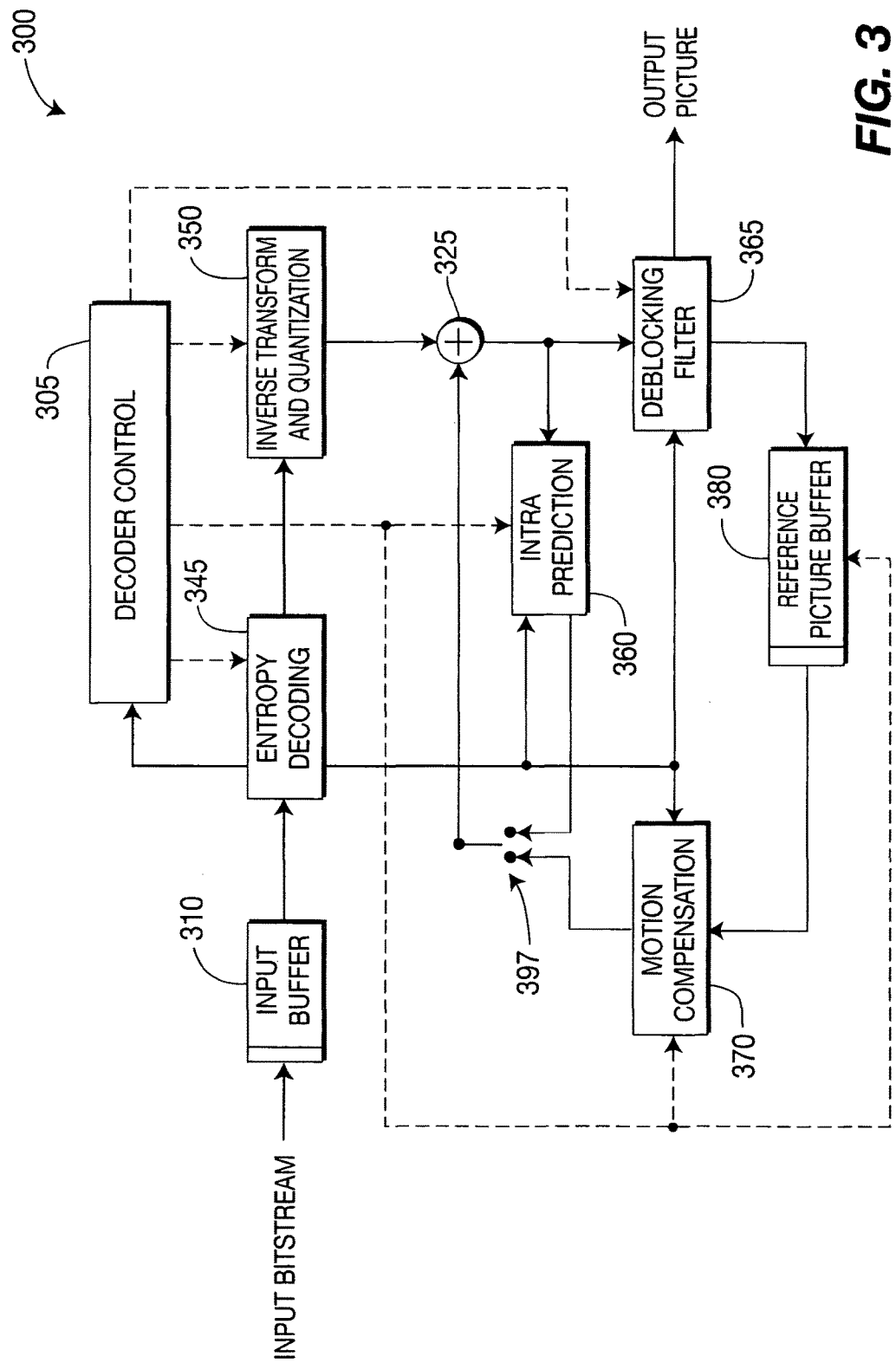
FIG. 3 is a block diagram for an exemplary video decoder to which the present principles may be applied, in accordance with an embodiment of the present principles.

Turning to FIG. 3, an exemplary video decoder to which the present principles may be applied is indicated generally by the reference numeral 300.

The video decoder 300 includes an input buffer 310 having an output connected in signal communication with a first input of the entropy decoder 345. A first output of the entropy decoder 345 is connected in signal communication with a first input of an inverse transformer and inverse quantizer 350. An output of the inverse transformer and inverse quantizer 350 is connected in signal communication with a second non-inverting input of a combiner 325. An output of the combiner 325 is connected in signal communication with a second input of a deblocking filter 365 and a first input of an intra prediction module 360. A second output of the deblocking filter 365 is connected in signal communication with a first input of a reference picture buffer 380. An output of the reference picture buffer 380 is connected in signal communication with a second input of a motion compensator 370.

A second output of the entropy decoder 345 is connected in signal communication with a third input of the motion compensator 370 and a first input of the deblocking filter 365. A third output of the entropy decoder 345 is connected in signal communication with an input of a decoder controller 305. A first output of the decoder controller 305 is connected in signal communication with a second input of the entropy decoder 345. A second output of the decoder controller 305 is connected in signal communication with a second input of the inverse transformer and inverse quantizer 350. A third output of the decoder controller 305 is connected in signal communication with a third input of the deblocking filter 365. A fourth output of the decoder controller 305 is connected in signal communication with a second input of the intra prediction module 360, with a first input of the motion compensator 370, and with a second input of the reference picture buffer 380.

An output of the motion compensator 370 is connected in signal communication with a first input of a switch 397. An output of the intra prediction module 360 is connected in signal communication with a second input of the switch 397. An output of the switch 397 is connected in signal communication with a first non-inverting input of the combiner 325.

An input of the input buffer 310 is available as an input of the decoder 300, for receiving an input bitstream. A first output of the deblocking filter 365 is available as an output of the decoder 300, for outputting an output picture.

One or more embodiments of the present principles are directed to accurate rate control for video encoding, on a picture level. Of course, the present principles are not limited solely to picture level rate control and, given the teachings of the present principles provided herein, may be readily extended to other levels relating to video encoding, while maintaining the spirit of the present principles. Nonetheless, it is to be appreciated that when a rate control method obtains bit rate accuracy on a picture level, the rate control method can easily achieve the bit rate accuracy for longer time intervals.

Embodiments of the present principles improve the accuracy of rate control in a video encoder. As mentioned above, prior art, rate control algorithms typically rely on the adjustment of the quantization step size parameter in order to control the bit rate accuracy. However, in accordance with one or more embodiments of the present principles, the rounding offset is used to improve the bit rate control accuracy.

That is, one or more embodiments of the present principles advantageously introduce another dimension, the rounding offset, into the rate control method used in a video encoder and achieve very accurate rate control for each picture with homogeneous quality within the picture. When a rate control method in accordance with an embodiment of the present principles is applied to other applications where the bit rate accuracy is measured in longer intervals than a picture, such rate control method can easily achieve accurate rate control over the longer intervals.

Thus, in accordance with one or more embodiments of the present principles, we propose to include another quantization parameter, the rounding offset s, to improve the rate control accuracy on a picture level. Both the quantization step size and the rounding offset affect the number of bits, R, used by the encoder. This can be described mathematically as follows:

$$R(q,s)=f(q,s), \quad (4)$$

where the function f(.) describes how the quantization step size and the rounding offset affect the number of bits. One example of the function is as follows:

$$\ln(R(q,s))=k_s \times s + k_q \times q + c, \quad (5)$$

where $k_s$, $k_q$ and c are constants.

FIGS. 4-7 illustrate some exemplary embodiments of the present principles that include rounding offset in addition to quantization step size in a rate control method. Depending on the way the number of bits is allocated, embodiments of the present principles could serve any of a variable-bit-rate (VBR) or constant-bit-rate (CBR) application. Embodiments of the present principles may also be a part of a multi-pass encoder and provide information for other passes.

Embodiment 1

Figure 4:
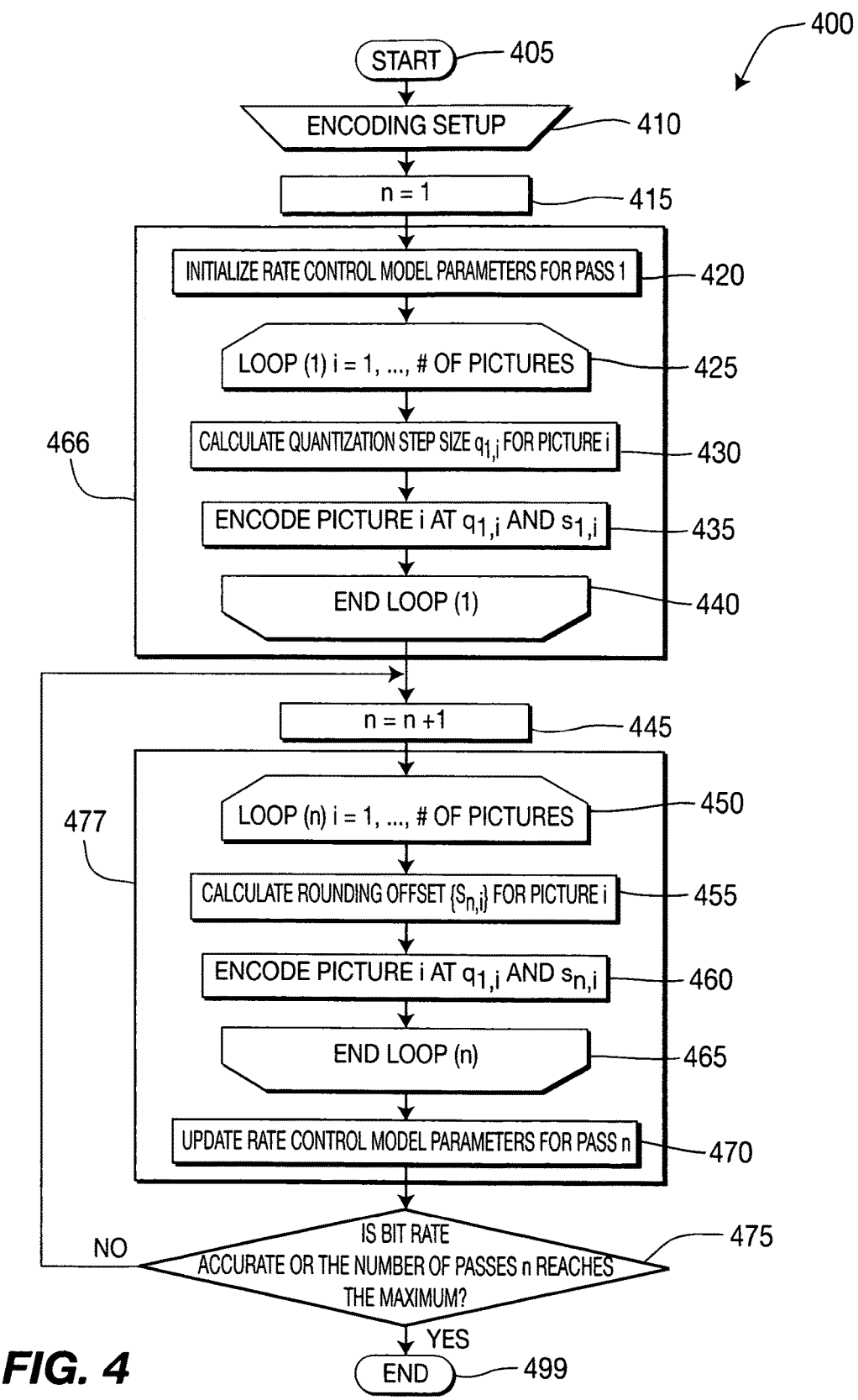
FIG. 4 is a flow diagram for an exemplary rate control method in a multi-pass video encoder, the method including a non-constant rounding offset, in accordance with an embodiment of the present principles.

Turning to FIG. 4, an exemplary rate control method in a multi-pass video encoder, where the method includes a non-constant rounding offset, is indicated generally by the reference numeral 400. The method 400 involves a first pass 466 and one or more subsequent passes (collectively indicated by the reference numeral 477).

The method 400 includes a start block 405 that passes control to a function block 410. The function block 410 performs and/or otherwise involves an encoding setup, and passes control to a function block 415. The function block 415 initializes a variable n equal to one, and passes control to a function block 420. The function block 420 initializes rate control model parameters for pass 1, and passes control to a loop limit block 425. The loop limit block 425 performs a loop over each picture in a current video sequence being processed, using a variable i, where i=1, . . . , number (#) of pictures, and passes control to a function block 430. The function block 430 calculates the quantization step size $q_{1,i}$ (e.g., given the rounding offset $s_1$) for picture i, and passes control to a function block 435. The function block 435 encodes the picture i at $q_{1,i}$ and an initial rounding offset $s_{1,i}$, and passes control to a loop limit block 440. The loop limit block 440 ends the first loop, and passes control to a function block 445.

The function block 445 increments the variable n by one (i.e., n=n+1), and passes control to a loop limit block 450.

The loop limit block 450 performs an $n^{th}$ loop over each picture in the current video sequence being processed, using the variable i, where i=1, . . . , number (#) of pictures, and passes control to a function block 455. The function block 455 calculates (optionally using information from the previous pass(es)) the rounding offset $\{s_{n,i}\}$ for picture i, and passes control to a function block 460. The function block 460 encodes the picture i at $q_{1,i}$ and $s_{n,i}$, and passes control to a loop limit block 465. The loop limit block 465 ends the $n^{th}$ loop, and passes control to a function block 470. The function block 470 updates the rate control model parameters for pass n (e.g., based on the information from the previous passes), and passes control to a decision block 475.

The decision block 475 determines whether or not the bit rate is accurate (for example, based on one or more thresholds) or the number of passes n has reached a maximum number of passes. If so, then control is passed to an end block 499. Otherwise, control is returned to the function block 445.

Thus, in method 400, the first-pass 466 encodes all macroblocks at $q_1$ for a picture. Existing rate control algorithms that adjust q to meet the target bit rate may be used, including, but not limited to, TM5, TMN8, the ρ-domain rate control algorithm, and so forth. In the first pass, we set n=1. An initial rounding offset $s_1$ is used, and $k_{s,1}$ is set to a default value, e.g., $k_{s,1}$=1, as there is no prior knowledge about $k_{s,1}$ at this stage. Since there are only limited choices of $q_1$, the obtained number of bits in the first pass, $R_1$, will be around the target number of bits, $R_T$, but often not close enough to meet the application requirement. Some parameters are pre-defined and may be inaccurate in the first pass. In the subsequent passes, using the model of R(q,s), we adjust the rounding offset s to improve the accuracy.

After each pass, we increment n by 1, i.e., n=n+1. During the $n^{th}$ pass, to close the gap between $R_T$ and $R_{n-1}$, a new rounding offset is calculated using the example function in equation (5) as follows:

$$s_n = \frac{1}{k_{s,n-1}} \ln \frac{R_T}{R_{n-1}} + s_{n-1}, \qquad (6)$$

The quantization step size $q_1$ and $s_n$ are used for the $n^{th}$-pass encoding with the resulting number of bits $R_n$. After the encoding of all pictures, we update $k_s$ using the information from the previous passes as follows:

$$k_{s,n} = \frac{\ln \frac{R_n}{R_{n-1}}}{s_n - s_{n-1}}, \qquad (7)$$

When there are multiple pictures encoded in one pass, all the information from some or all of the pictures can then be used to update $k_s$ as the linear regression between the sets $$\left\{ \ln \frac{R_n}{R_{n-1}} \right\}$$

and $\{s_n - s_{n-1}\}$.

The process of computing a new rounding offset s and updating $k_s$ to improve the bit rate accuracy can keep going on until the specified bit rate accuracy is met or the maximum number of passes is reached.

The advantage of method 400 over the prior art rate control method 100 of FIG. 1 is that all macroblocks in a picture are encoded at the same quantization step sizes and rounding offsets and, therefore, the quality of all macroblocks are consistent.

Embodiment 2

Figure 5:
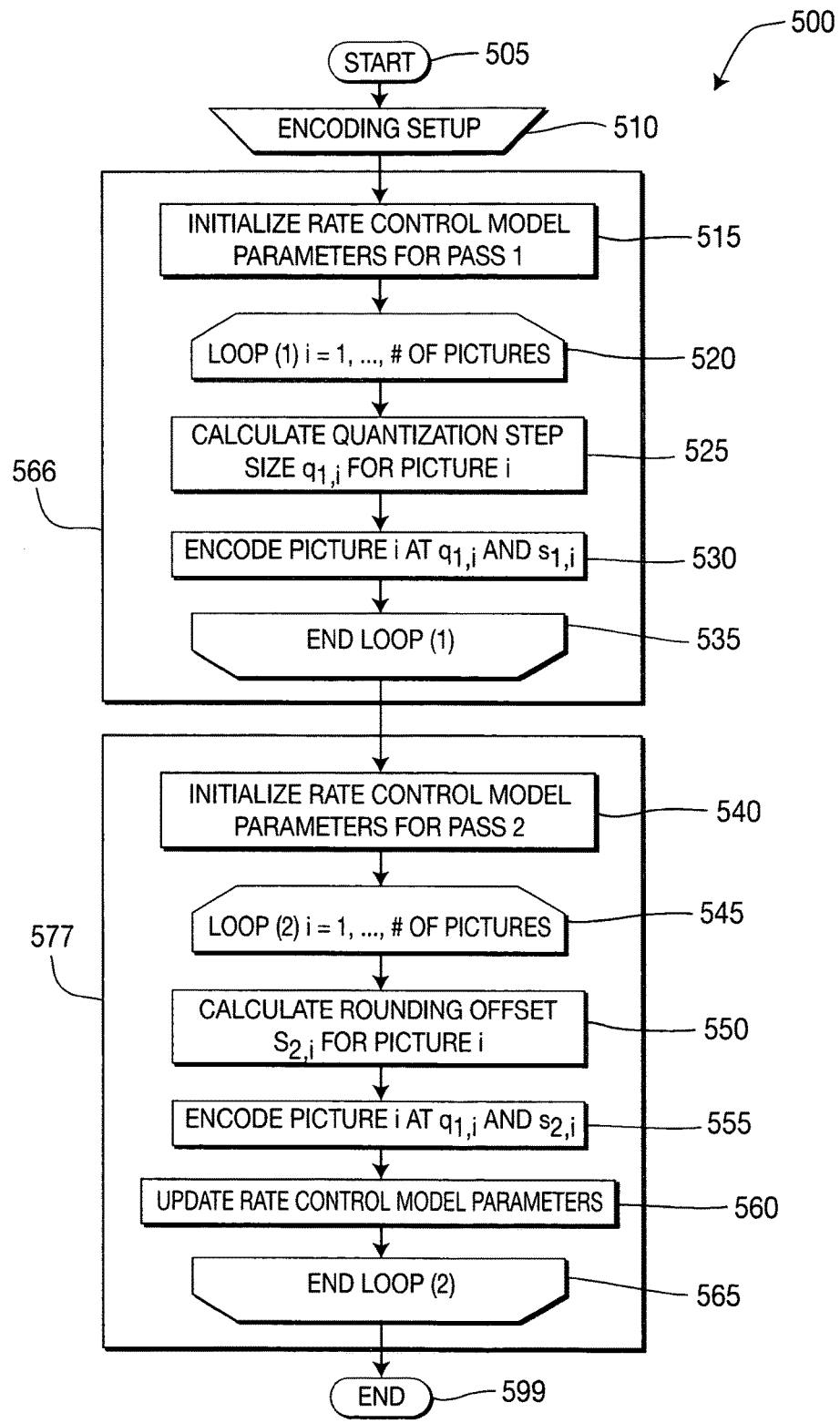
FIG. 5 is a flow diagram for another exemplary rate control method in a multi-pass video encoder, the method including a non-constant rounding offset, in accordance with an embodiment of the present principles.

Turning to FIG. 5, another exemplary rate control method in a multi-pass video encoder, where the method includes a non-constant rounding offset, is indicated generally by the reference numeral 500. The method 500 involves a first pass 566 and a second pass 577.

The method 500 includes a start block 505 that passes control to a function block 510. The function block 510 performs and/or otherwise involves an encoding setup, and passes control to a function block 515. The function block 515 initializes rate control model parameters for pass 1, and passes control to a loop limit block 520. The loop limit block 520 performs a loop over each picture in a current video sequence being processed, using a variable i, where i=1, . . . , number (#) of pictures, and passes control to a function block 525. The function block 525 calculates the quantization step size $q_{1,i}$ (e.g., given the rounding offset $s_1$) for picture i, and passes control to a function block 530. The function block 530 encodes the picture i at $q_{1,i}$ and an initial rounding offset $s_{1,i}$, and passes control to a loop limit block 535. The loop limit block 535 ends the first loop, and passes control to a function block 540.

The function block 540 initializes rate control model parameters for pass 2, and passes control to a loop limit block 545. The loop limit block 545 performs a second loop over each picture in the current video sequence being processed, using the variable i, where i=1, . . . , number (#) of pictures, and passes control to a function block 550. The function block 550 calculates (optionally using information from the previous pass) the rounding offset $\{s_{2,i}\}$ for picture i, and passes control to a function block 555. The function block 555 encodes the picture i at $q_{1,i}$ and $s_{2,i}$, and passes control to a function block 560. The function block 560 updates the rate control model parameters for the second pass (e.g., based on information from the first pass and previously encoded pictures in the second pass), and passes control to a loop limit block 565. The loop limit block 565 ends the second loop, and passes control to an end block 599.

It is to be appreciated that the method 500 is a variation of method 400.

In this embodiment, we update the rate control model parameters within the second pass (function block 560) using the information from the first pass 566 and previously encoded pictures in the second pass 577. In an embodiment, we can use information from the first pass 566 and all the previously encoded pictures in the second pass 577 to update the parameters for the current picture. In another embodiment, we can use the information from the first pass 566 and n previously encoded pictures in the second pass 577 to update the parameters for the current picture.

One advantage of method 500 with respect to method 400 of FIG. 4 is that the rate control model parameters are updated within the second pass 577. We speed up the process by removing the third and/or further passes completely.

Embodiment 3

Turning to FIG. 6, an exemplary rate control method in a single-pass video encoder, where the method includes a non-constant rounding offset, is indicated generally by the reference numeral 600. The single pass is indicated by the reference numeral 666.

The method 600 includes a start block 605 that passes control to a function block 610. The function block 610 performs and/or otherwise involves an encoding setup, and passes control to a function block 620. The function block 620 initializes rate control model parameters, and passes control to a loop limit block 625. The loop limit block 625 performs a loop over each picture in a current video sequence being processed, using a variable i, where i=1, . . . , number (#) of pictures, and passes control to a function block 630. The function block 630 calculates the quantization step size $q_{1,i}$ and the rounding offset $s_{1,i}$ for picture i, and passes control to a function block 635. The function block 635 encodes the picture i at $q_{1,i}$ and a rounding offset $s_{1,i}$, and passes control to a function block 637. The function block 637 updates the rate control model parameters, and passes control to a loop limit block 640. The loop limit block 640 ends the loop, and passes control to an end block 699.

It is to be appreciated that the method 600 is a variation of method 500. In the method 600, the rate control model parameters are updated within the first pass (block 637). We further speed up the process by encoding the pictures once.

Embodiment 4

Turning to FIG. 7, an exemplary rate control method in a transcoder is indicated generally by the reference numeral 700.

The method 700 includes a start block 705 that passes control to a function block 710. The function block 710 performs and/or otherwise involves an encoding setup, and passes control to a function block 715. The function block 715 reads and parses the bitstream, and passes control to a loop limit block 720. The loop limit block 720 performs a loop over each picture in the bitstream, using a variable i, where i=1, . . . , number (#) of pictures, and passes control to a function block 725. The function block 725 calculates the quantization step size $q_i$ and the rounding offset $s_i$ for picture i, and passes control to a function block 730. The function block 730 encodes the picture i at $q_i$ and $s_i$, and passes control to a loop limit block 735. The loop limit block 735 ends the loop, and passes control to an end block 799.

It is to be appreciated that function block 710 may involve setting up the target bit rate after transcoding and any other set of encoding parameters. It is to be further appreciated that function block 715 parses information from the bitstream that is input for transcoding. The information to be parsed may include, but is not limited to, the number of bits used for each picture, the quantization parameters, motion vectors, and so forth for macroblock in pictures in the bitstream. It is to be appreciated that the information to be parsed may also include rounding offset information, as described below. Based on the parsed information from the bitstream and the transcoding requirement, function block 725 calculates the quantization step size q the rounding offset s for a picture.

When parsing the information (by function block 715), quantization step size is easily accessible since it is embedded in the bitstream. To obtain the rounding offset, we may need to estimate the rounding offset based on the bitstream. Another approach is to embed the rounding offset information in the bitstream to enable easy parameter extraction. Given the teachings of the present principles provided herein, these and other variations and implementations of the present principles are readily determined by one of ordinary skill in this and related arts, while maintaining the spirit of the present principles.

Figure 8:
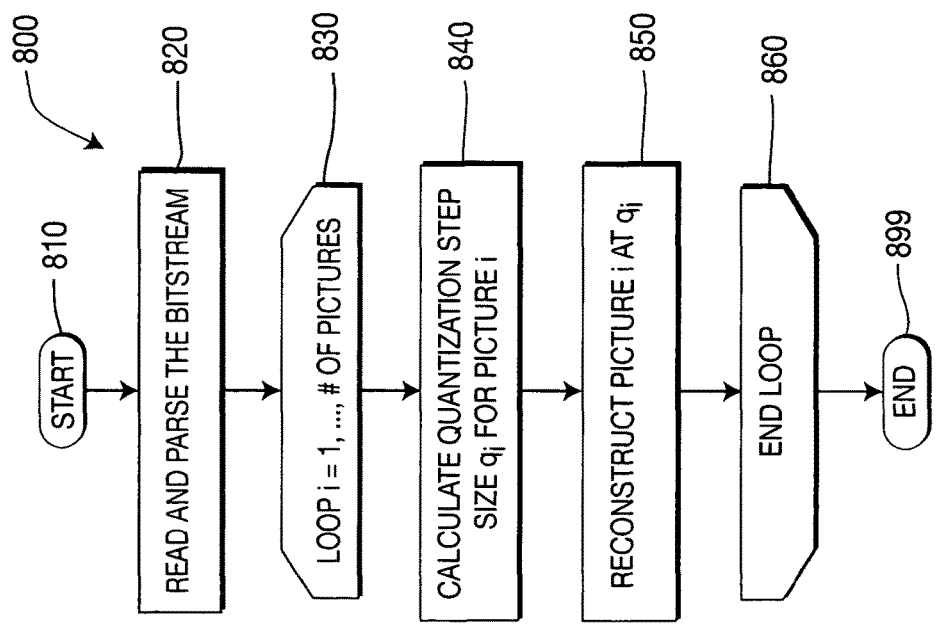
FIG. 8 is a flow diagram for an exemplary method for decoding image data, in accordance with an embodiment of the present principles.

Turning to FIG. 8, an exemplary method for decoding image data is indicated generally by the reference numeral 800.

The method 800 includes a start block 810 that passes control to a function block 820. The function block 820 reads and parses the bitstream, and passes control to a loop limit block 830. The loop limit block 830 begins over each of pictures in the bitstream, using a variable i, where i=1, . . . , number (#) of pictures in bitstream, and passes control to a function block 840. The function block 840 calculates the quantization step size $q_i$ for picture i, and passes control to a function block 850. The function block 850 reconstructs picture i at the quantization step size $q_i$, and passes control to a loop limit block 860. The loop limit block 860 ends the loop, and passes control to an end block 899.

Figure 9:
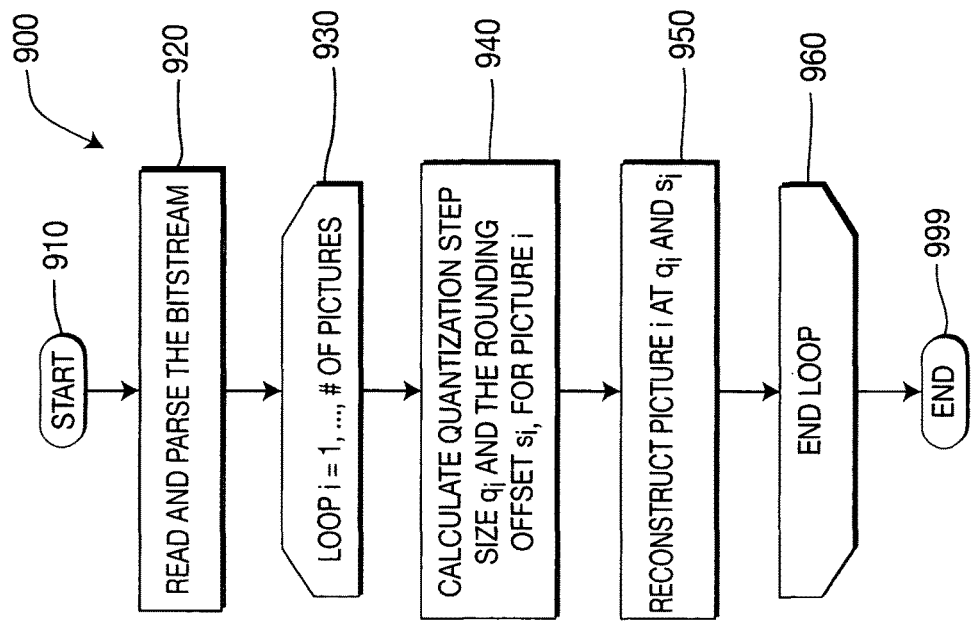
FIG. 9 is a flow diagram for another exemplary method for decoding image data, in accordance with an embodiment of the present principles.

Turning to FIG. 9, another exemplary method for decoding image data is indicated generally by the reference numeral 900.

The method 900 includes a start block 910 that passes control to a function block 920. The function block 920 reads and parses the bitstream, and passes control to a loop limit block 930. The loop limit block 930 begins a loop over each of pictures in the bitstream, using a variable i, where i=1, . . . , number (#) of pictures in bitstream, and passes control to a function block 940. The function block 940 calculates the quantization step size $q_i$ and the rounding offset $s_i$ for picture i, and passes control to a function block 950. The function block 950 reconstructs picture i at the quantization step size $q_i$ and the rounding offset $s_i$, and passes control to a loop limit block 960. The loop limit block 960 ends the loop, and passes control to an end block 999.

A description will now be given of some of the many attendant advantages/features of the present invention, some of which have been mentioned above. For example, one advantage/feature is an apparatus having a video encoder for encoding image data using rate control. The rate control involves estimating a quantization step size and adjusting a rounding offset. The rounding offset is capable of being non-constant during the encoding.

Another advantage/feature is the apparatus having the video encoder as described above, wherein the rate control is applied to at least one of a constant-bit-rate application, a variable-bit-rate application, and a transcoding application.

Yet another advantage/feature is the apparatus having the video encoder as described above, wherein rate control parameters for the rate control are based on at least one of a ρ-domain rate model, a TM5 rate model, and a TMN8 rate model.

Moreover, another advantage/feature is the apparatus having the video encoder as described above, wherein the video encoder encodes the image data in a resultant bitstream compliant with the International Organization for Standardization/International Electrotechnical Commission Moving Picture Experts Group-4 Part 10 Advanced Video Coding standard/International Telecommunication Union, Telecommunication Sector H.264 recommendation.

Further, another advantage/feature is the apparatus having the video encoder as described above, wherein the video encoder is a multi-pass video encoder, and rate control model parameters for the rate control are updated based on information from at least one of previous encoding passes and previously encoded pictures of a current pass.

Also, another advantage/feature is the apparatus having the video encoder as described above, wherein rate control model parameters for the rate control are updated based on information from previously encoded pictures.

Additionally, another advantage/feature is the apparatus having the video encoder as described above, wherein the video encoder encodes the image data in a resultant bitstream, and embeds at least one of the rounding offset and rounding offset information in the resultant bitstream.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus comprising:
a video encoder for encoding image data using rate control in which a quantization level is a function of a sum of a first quantity and a rounding offset, wherein the first quantity is inversely proportional to a quantization step size, wherein the rate control includes iterative calculations in which the quantization step size is kept constant for all pictures of the image data being encoded and for each picture of the image data being encoded the rounding offset is adjusted iteratively until a specified bitrate accuracy is met or a maximum number of iterations is reached, all macroblocks of a given picture of the image data being encoded are encoded using the adjusted rounding offset for the given picture.

2. The apparatus of claim 1, wherein rate control parameters for the rate control are based on at least a ρ-domain rate model, a TM5 rate model, or a TMN8 rate model.

3. The apparatus of claim 1, wherein said video encoder is further for encoding the image data in a resultant bitstream compliant with the International Organization for Standardization/International Electrotechnical Commission Moving Picture Experts Group-4 Part 10 Advanced Video Coding standard/International Telecommunication Union, Telecommunication Sector H.264 recommendation.

4. The apparatus of claim 1, wherein said video encoder is a multi-pass video encoder, and rate control model parameters for the rate control are updated based on information from at least previous encoding passes or previously encoded pictures of a current pass.

5. The apparatus of claim 1, wherein rate control model parameters for the rate control are updated based on information from previously encoded pictures.

6. The apparatus of claim 1, wherein said video encoder is further for encoding the image data in a resultant bitstream and embedding at least the rounding offset or rounding offset information in the resultant bitstream.

7. A method comprising:
encoding image data using rate control in which a quantization level is a function of a sum of a first quantity and a rounding offset, wherein the first quantity is inversely proportional to a quantization step size, wherein the rate control includes iterative calculations in which the quantization step size is kept constant for all pictures of the image data being encoded and for each picture of the image data being encoded the rounding offset is adjusted iteratively until a specified bitrate accuracy is met or a maximum number of iterations is reached, all macroblocks of a given picture of the image data being encoded are encoded using the adjusted rounding offset for the given picture.

8. The method of claim 7, wherein rate control parameters for the rate control are based on at least a ρ-domain rate model, a TM5 rate model, or a TMN8 rate model.

9. The method of claim 7, wherein said encoding comprises encoding the image data in a resultant bitstream compliant with the International Organization for Standardization/International Electrotechnical Commission Moving Picture Experts Group-4 Part 10 Advanced Video Coding standard/International Telecommunication Union, Telecommunication Sector H.264 recommendation.

10. The method of claim 7, wherein said encoding is performed in a multi-pass video encoder, and rate control model parameters for the rate control are updated based on information from at least previous encoding passes or previously encoded pictures of a current pass.

11. The method of claim 7, wherein rate control model parameters for the rate control are updated based on information from previously encoded pictures.

12. The method of claim 7, wherein said encoding comprises encoding the image data in a resultant bitstream and embedding at least the rounding offset or rounding offset information in the resultant bitstream.

13. An apparatus comprising:
a video decoder for decoding image data in a bitstream using rate control in which a quantization level is a function of a sum of a first quantity and a rounding offset, wherein the first quantity is inversely proportional to a quantization step size, wherein the rate control includes iterative calculations in which the quantization step size is kept constant for all pictures of the image data being decoded and for each picture of the image data being decoded and the rounding offset is adjusted, iteratively until a specified bitrate accuracy is met or a maximum number of iterations is reached, all macroblocks of a given picture of the image data being decoded are decoded using the adjusted rounding offset for the given picture, the rounding offset being extracted from the bitstream or estimated based on information at least one of in and pertaining to the bitstream.

14. The apparatus of claim 13, wherein rate control parameters for the rate control are based on at least a ρ-domain rate model, a TM5 rate model, or a TMN8 rate model.

15. The apparatus of claim 13, wherein the bitstream is compliant with the International Organization for Standardization/International Electrotechnical Commission Moving Picture Experts Group-4 Part 10 Advanced Video Coding standard/International Telecommunication Union, Telecommunication Sector H.264 recommendation.

16. A method comprising:
decoding image data in a bitstream using rate control in which a quantization level is a function of a sum of a first quantity and a rounding offset, wherein the first quantity is inversely proportional to a quantization step size, wherein the rate control includes iterative calculations in which the quantization step size is kept constant for all pictures of the image data being decoded and for each picture of the image data being decoded the rounding offset is adjusted iteratively until a specified bitrate accuracy is met or a maximum number of iterations is reached, all macroblocks of a given picture of the image data being decoded are decoded using the adjusted rounding offset for the given picture, the rounding offset being extracted from the bitstream or estimated based on information at least one of in and pertaining to the bitstream.

17. The method of claim 16, wherein rate control parameters for the rate control are based on at least a ρ-domain rate model, a TM5 rate model, or a TMN8 rate model.

18. The method of claim 16, wherein the bitstream is compliant with the International Organization for Standardization/International Electrotechnical Commission Moving Picture Experts Group-4 Part 10 Advanced Video Coding standard/International Telecommunication Union, Telecommunication Sector H.264 recommendation.

19. A non-transitory computer-readable medium comprising computer-executable configured for:

encoding image data in which a quantization level is a function of a sum of a first quantity and a rounding offset, wherein the first quantity is inversely proportional to a quantization step size, wherein the rate control includes iterative calculations in which the quantization step size is kept constant for all pictures of the image data being encoded and for each picture of the image data being encoded the rounding offset is adjusted iteratively until a specified bitrate accuracy is met or a maximum number of iterations is reached, all macroblocks of a given picture of the image data being encoded are encoded using the adjusted rounding offset for the given picture.

20. The computer-readable medium of claim 19, wherein rate control parameters for the rate control are based on at least a ρ-domain rate model, a TM5 rate model, or a TMN8 rate model.

21. The computer-readable medium of claim 19, wherein said encoding comprises encoding the image data in a resultant bitstream compliant with the International Organization for Standardization/International Electrotechnical Commission Moving Picture Experts Group-4 Part 10 Advanced Video Coding standard/International Telecommunication Union, Telecommunication Sector H.264 recommendation.

22. The computer-readable medium of claim 19, wherein said encoding is performed in a multi-pass video encoder, and rate control model parameters for the rate control are updated based on information from at least previous encoding passes or previously encoded pictures of a current pass.

23. The computer-readable medium of claim 19, wherein rate control model parameters for the rate control are updated based on information from previously encoded pictures.

24. The computer-readable medium of claim 19, wherein said encoding comprises encoding the image data in a resultant bitstream and embedding at least the rounding offset or rounding offset information in the resultant bitstream.

25. A non-transitory computer-readable medium comprising computer-executable code configured for:
decoding image data in a bitstream using rate control in which a quantization level is a function of a sum of a first quantity and a rounding offset, wherein the first quantity is inversely proportional to a quantization step size, wherein the rate control includes iterative calculations in which the quantization step size is kept constant for all pictures of the image data being decoded and for each picture of the image data being decoded the rounding offset is adjusted iteratively until a specified bitrate accuracy is met or a maximum number of iterations is reached, all macroblocks of a given picture of the image data being decoded are decoded using the adjusted rounding offset for the given picture, the rounding offset being extracted from the bitstream or estimated based on information at least one of in and pertaining to the bitstream.

26. The computer-readable medium of claim 25, wherein rate control parameters for the rate control are based on at least a ρ-domain rate model, a TM5 rate model, or a TMN8 rate model.

27. The computer-readable medium of claim 25, wherein the bitstream is compliant with the International Organization for Standardization/International Electrotechnical Commission Moving Picture Experts Group-4 Part 10 Advanced Video Coding standard/International Telecommunication Union, Telecommunication Sector H.264 recommendation.

* * * * *